United States Patent [19]
Perkins

[11] Patent Number: 4,812,612
[45] Date of Patent: Mar. 14, 1989

[54] HYDRAULIC LOCK FOR RESISTANCE WELDERS

[75] Inventor: E. James Perkins, Clarkston, Mich.

[73] Assignee: Chrysler Motors Corporation, Highland Park, Mich.

[21] Appl. No.: 142,583

[22] Filed: Jan. 11, 1988

[51] Int. Cl.$^4$ ............................................. B23K 11/30
[52] U.S. Cl. ............................................. 219/89; 91/41
[58] Field of Search .................... 219/89, 86.23, 86.25; 91/41, 43, 45, 189

[56] References Cited

U.S. PATENT DOCUMENTS

| | | | |
|---|---|---|---|
| 3,603,205 | 9/1971 | Shearer | 91/45 |
| 3,985,194 | 10/1976 | Knutson | 180/89 |
| 4,126,082 | 11/1978 | Klitz | 91/41 |
| 4,175,793 | 11/1979 | Clemmons | 303/89 |
| 4,185,539 | 1/1980 | Stratienko | 91/45 |
| 4,196,798 | 4/1980 | Barsted | 192/3 N |
| 4,312,497 | 1/1982 | Whaley | 254/344 |

FOREIGN PATENT DOCUMENTS 1232626  5/1971  United Kingdom ............ 219/86.23

*Primary Examiner*—Clifford C. Shaw
*Attorney, Agent, or Firm*—Mark P. Calcaterra

[57] ABSTRACT

A hydraulic system for use in a resistance welding machine with a stationary electrode and a variable electrode to provide adjustment of the stationary electrode to ensure proper positioning to maintain weld quality. The hydraulic system comprising an actuated piston attached to the stationary electrode, a motive piston to control the flow of hydraulic fluid in the hydraulic system, a hydraulic locking device to lock the stationary electrode in a stationary position to resist forces during the welding operation and a pneumatic control system to operate the hydraulic system.

4 Claims, 5 Drawing Sheets

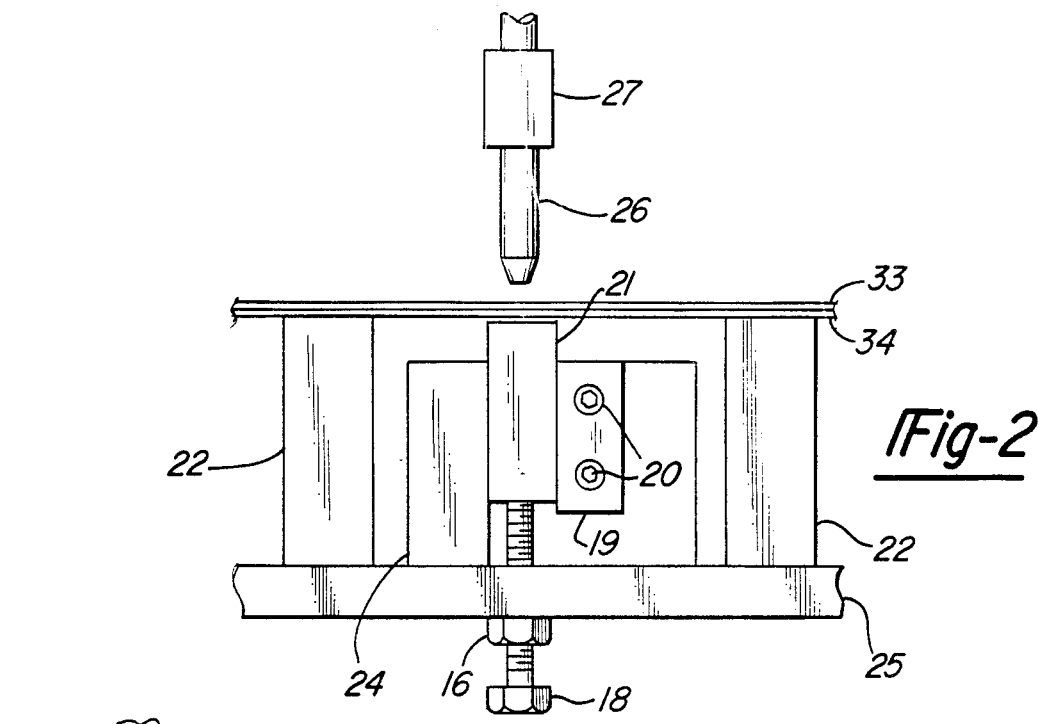
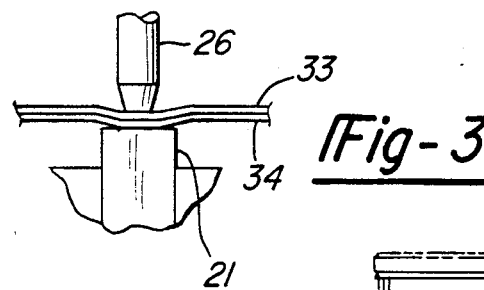
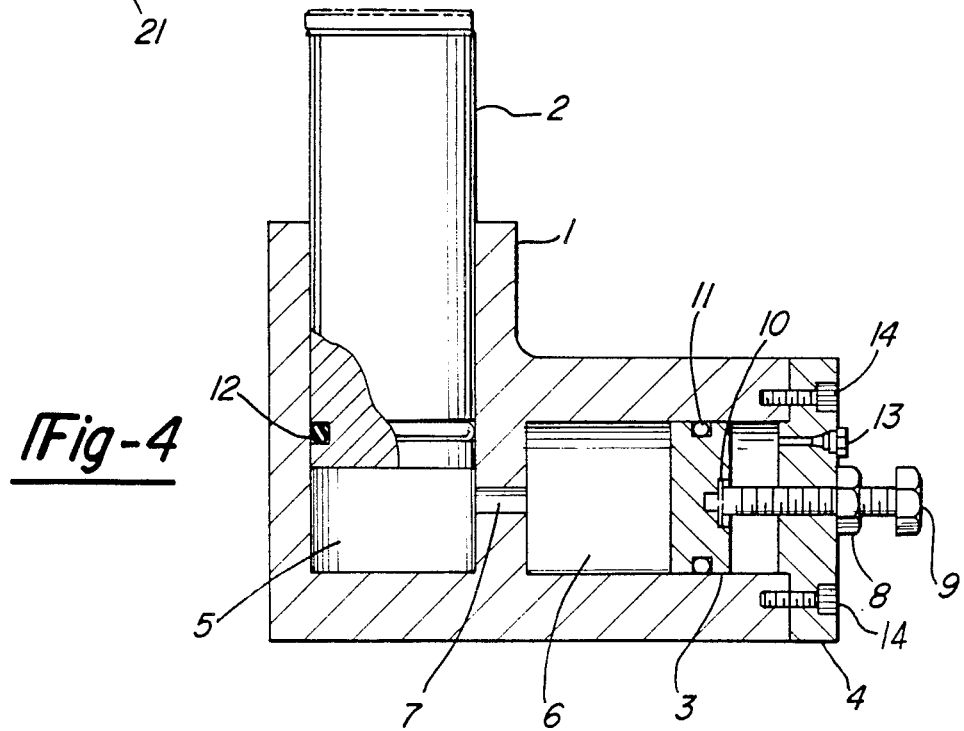

HYDRAULIC LOCK FOR RESISTANCE WELDERS

BACKGROUND OF THE INVENTION

This invention relates to positioning systems in resistance welding machines. During the welding process a consumable component, known as a welding electrode, must be maintained in the proper position to ensure a proper weld. Misalignment of the electrode occurs due to electro-mechanical erosion.

In resistance welding machines, the product components to be welded are clamped in proper relationship to one another and welded together maintaining the desired form. Two welding electrodes are used during the welding process, one on each surface of the product components. One electrode has a variable position to provide clearance for insertion and removal of the product components being welded. The other electrode maintains a stationary position.

The stationary electrode must maintain the proper position to mechanically resist the welding force and conduct the high welding currents. As welding occurs, the stationary electrode deteriorates and must be adjusted to maintain proper welding position.

In the state-of-art resistance welding machines, adjustment of the stationary electrode is made by unclamping the electrode, turning a bolt in communication with the electrode thereby adjusting it to proper welding position, then re-clamping the electrode in place.

Precise adjustment is difficult to achieve in most cases because adjustment devices cannot be reached with the product components clamped in place. Proper location of the stationary electrode resting against the surface of the product components is in question if the product components are not in place when the adjustment is made. When the variable electrode and stationary electrode are not pressing tightly against the product components, as proper adjustment would achieve, the welding forces which are calculated to create a quality weld are consumed by deforming the clamped product until it contacts the stationary electrode. This prevents a quality weld from being constructed at the prescribed schedule of current, time and force for which the machine was designed.

SUMMARY OF THE INVENTION

The subject invention provides an adjusting means for the stationary electrode which will allow quick and proper adjustment with the product components clamped in place. This will urge a proper weld of the currently positioned product components without distorting the metal of the product.

The adjusting means must be able to withstand the force of the welding electrodes. To accomplish this, the subject invention utilizes a hydraulic lock means.

The subject invention consists of a hydraulic system utilizing two pistons, the actuated piston which positions the stationary electrode and the motive piston which controls the hydraulic pressure on the actuated piston, thereby creating adjusting movements. The motive piston allows the adjustment to be made while the product is clamped in place. This hydraulic system can be modified to allow adjustment of the electrode to take place from a remote position by utilizing a length of conduit between the motive piston fluid chamber and the actuated piston chamber in the hydraulic system.

The hydraulic lock mechanism is shown in one embodiment as a bolt attached to the motive piston which is engaged in the cover over the motive piston. The hydraulic pressure on the actuated piston, the adjusting device, is only relieved by turning the bolt. The subject invention can resist the welding force while still maintaining a minimal effort to adjust the stationary electrode.

It is, therefore, an object of the invention to provide a linear positioning device for a stationary welding electrode which incorporates a hydraulic lock to lock the stationary electrode in place.

Another object of the invention is to provide a linear positioning device with a hydraulic lock which can be adjusted using low force and which can further resist a large opposing force.

It is the further object of this invention to achieve this positioning automatically through pneumatic pressure.

These and other objects and advantages of the linear adjusting hydraulic lock system will become apparent from the following detailed description of the preferred embodiment, drawings, and claims.

DESCRIPTION OF THE DRAWINGS

FIG. 2 is a sectional view of the two panels to be welded in the resistance welding machine; the stationary electrode is shown out of adjustment;

FIG. 3 is a magnified sectional view of the panels being welded in a resistance welding machine with the stationary electrode out of adjustment and the panels being deformed;

FIG. 4 is a sectional view of a hydraulic device for extending a linear actuator and providing a hydraulic lock;

DETAILED DESCRIPTION OF THE PREFERRED EMBODIMENT

Figure 1:
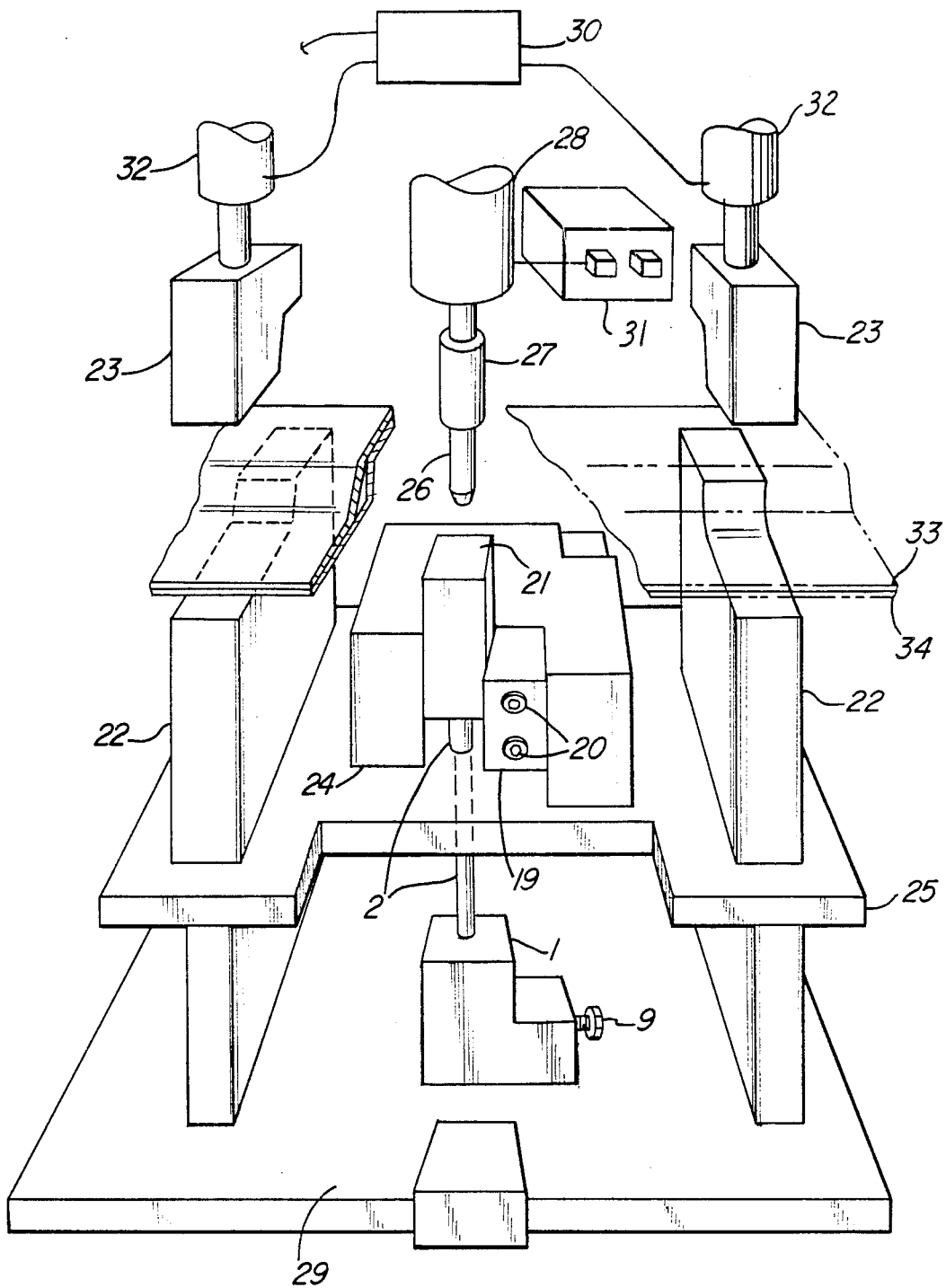
FIG. 1 is a sectional view of the subject invention supporting the machine's stationary electrode in a resistance welding machine.

Refer to FIG. 1 which illustrates the basic invention as it would be used in a resistance welding machine supporting a stationary wedge electrode. The machine frame 29 holds the lower fixture base 25, electrode holder 24, locators 22, clamp 19, and stationary electrode 21. The upper part of frame 29 (not shown) holds cylinder 28 to which is attached electrode holder 27 with variable electrode 26, and cylinders 32, along with clamps 23. Located in the back of frame 29 is a valve 30, connected to a compressed air supply. Also located in back of frame 29 is electrical transformer 31 connected to an electrical power source. The basic invention, comprising housing 1, actuating piston 2, bolt 9, and other components to be described in FIG. 4, is positioned below the components to be welded with actuated piston 2 passing through the lower fixture base 25, and contacting the bottom surface of stationary electrode 21. The stationary electrode is elevated to the correct location by loosening bolts 20 in clamp 19, allowing stationary electrode 21 freedom to move. The product components 33 and 34 to be welded are then loaded onto the fixture over locators 22 and clamped into position by actuating valve 30, which communicates with extending cylinder 32 and with clamps 23. Nut 8 (shown in FIG. 4) is loosened and bolt 9 is turned forcing actuated piston 2 upward, raising stationary electrode 21 to a stationary position against the bottom surface of the component 34 to be welded. Nut 8 is then tightened. Valve 30 is actuated, retracting cylinders 32 with clamps 23. The product components 33 and 34 are removed allowing access to tighten bolts 20, clamping electrode 21 in place with clamp 19 against electrode holder 24. Product components 33 and 34 are then reloaded onto locators 22 and clamped into position by cylinders 32 and clamps 23. The welding operation is then initiated, causing variable electrode 26 to be extended until it contacts the upper surface of component 33, applying the desired pressure and electrical current to form a resistance weld.

FIG. 2 shows a magnified sectional view of a current welding machine without the present invention for adjusting the stationary electrode 21. After bolts 20 in clamp 19 are loosened to free stationary electrode 21, nut 16 is loosened, allowing bolt 18 to turn in order to raise stationary electrode 21.

FIG. 3 shows a magnified sectional view of the welding electrodes in contact with product components 33 and 34, in which stationary electrode 21 is out of adjustment. The variable electrode 26 has been extended, bringing variable electrode 26 into contact with the upper surface of product component 33 to be welded. The misalignment of stationary electrode 21 consumes some of the welding force by deforming product components 33 and 34, thereby creating a resistance imbalance in the welding circuit causing a change in weld quality, increased surface heat, indentation marks, and general product distortion.

Referring now to FIG. 4, a sectional view of the subject invention is shown. The linear hydraulic adjusting actuator consists of an actuated piston 2, a motive piston 3, and a cover 4 mounted to the housing 1. In the preferred embodiment the motive piston 3 is actuated by a bolt 9, but other forms of actuating means may be provided to operate the piston as will be shown in FIG. 7.

Incompressible hydraulic fluid completely fills chamber 5, and reservoir 6, and passage 7. Bolt 9 is turned and, being threadably engaged in cover 4, moves motive piston 3 toward the left as shown in FIG. 4, displacing fluid from reservoir 6 through passage 7 into chamber 5, moving actuated piston 2 upward a proportional distance. Ring 10 keeps bolt 9 engaged in piston 3, but allows bolt 9 to slip in piston 3 so as not to rotate the piston. Seals 11 and 12 are in place to contain the hydraulic fluid. Bleeder hole 13 in cover 4 allows free and easy movement of piston 3. A hydraulic lock is formed as a result of the incompressibility of the hydraulic fluid. Bolts 14 hold cover 4 in place and resist the force exerted by piston 3, transmitted to cover 4 by bolt 9.

These forces are applied by variable electrode 26 during the welding operation.

Figure 5:
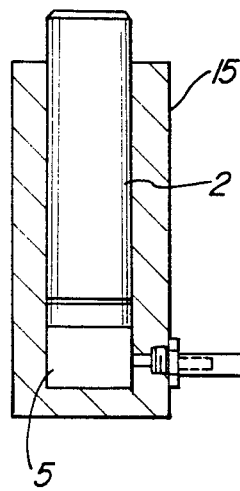
FIG. 5 is a sectional view of a hydraulic device as in FIG. 4, but with the motive piston remotely positioned.

Refer now to FIG. 5 which illustrates the basic components of the system as in FIGS. 1 and 4, but with the motive piston 3 remotely located. Housing 15 is provided with an actuated piston 2 and is connected by conduit 7A to housing 17 which contains motive piston 3 and cover 4. As in FIG. 4, a form other than a bolt may be used as an actuating means.

Figure 6:
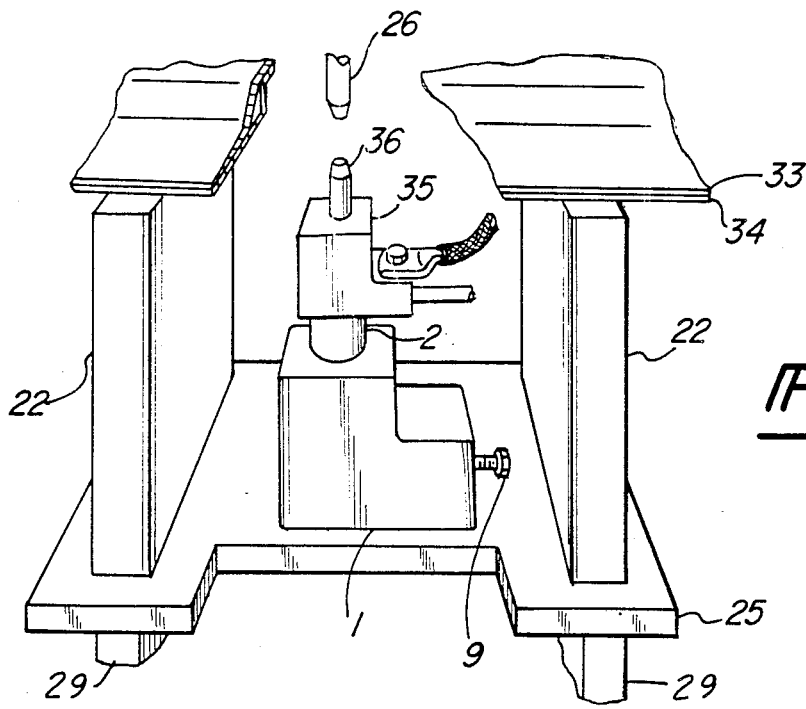
FIG. 6 is a sectional view of the subject invention in a resistance welding machine supporting the machine's non-clamped, movable type water-cooled electrode.

Refer now to FIG. 6 which illustrates the basic invention as it would be used in a welding machine supporting a non-clamped, adjustable, stationary electrode. The machine frame 29 holds the lower fixture base 25, locators 22, housing 1, including actuated piston 2, bolt 9 and other components shown in FIG. 4, electrode holder 35 and stationary electrode 36. The product components 33 and 34 are loaded onto locators 22 and clamped into place as in FIG. 1. The stationary electrode 36 is elevated to the correct stationary location by loosening nut 8 (not shown) and turning bolt 9, forcing actuated piston 2 upward, raising electrode holder 35 with stationary electrode 36 to the correct stationary location against the bottom surface of product component 34. Nut 8 is then tightened.

The incompressible hydraulic fluid in chamber 5, reservoir 6 and passage 7, as shown in FIG. 4, hydraulically lock piston 2 and electrode 36 in place resisting the forces opposing actuated piston 2 applied by the variable electrode 26 during the welding operation.

Figure 7:
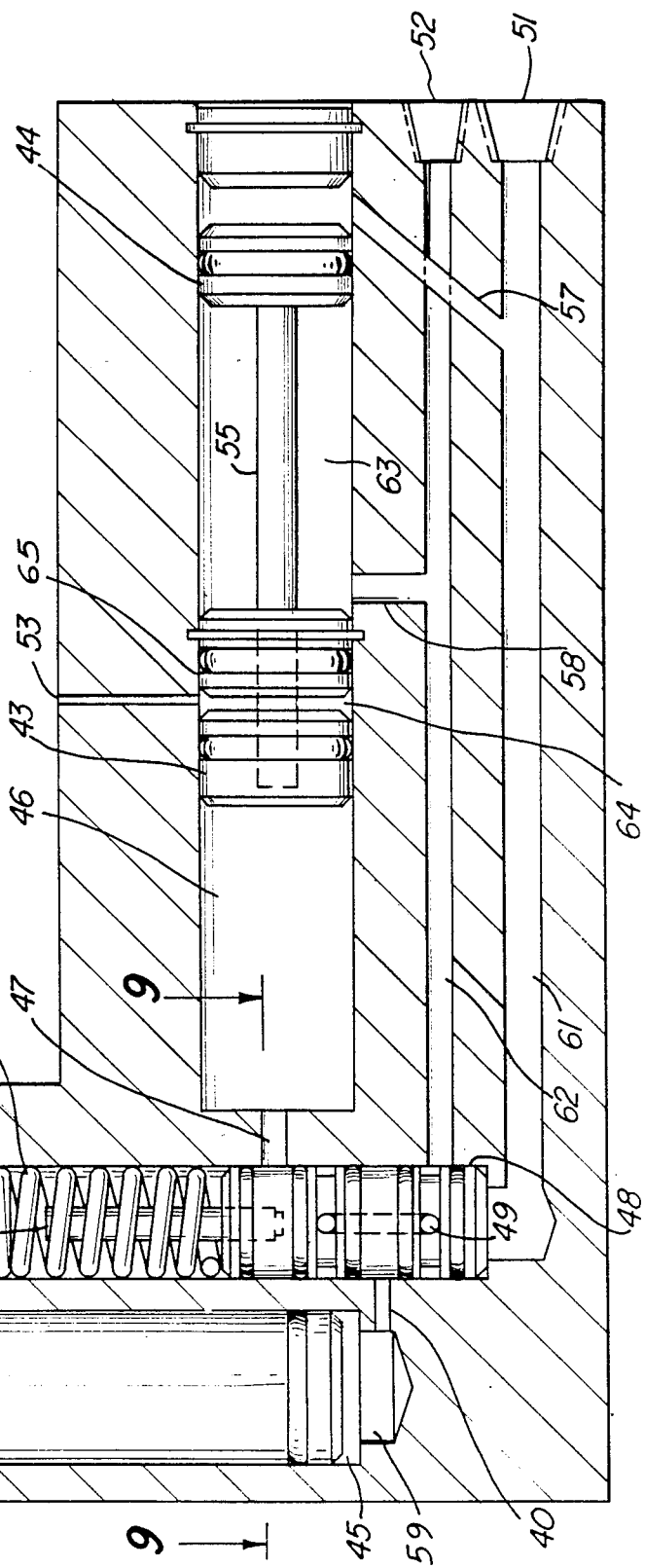
FIG. 7 is a sectional view of a spool valve piston means of extending and retracting the actuating piston through the use of pneumatic air pressure.

Refer now to FIG. 7 which illustrates a spool valve for extending and retracting the actuated piston through means of pneumatic air pressure. Air pressure is introduced into the system through air intake 51, putting pressure on the spool valve piston 48 and the exterior of motive piston 44, via conduits 61 and 57. The spool valve piston 48 moves upward until the shaft stop 56, attached to the upper portion of the spool valve piston 48, makes contact with the plug wall 50. When the spool valve piston 48 is in this upward position, hydraulic fluid can flow from reservoir 46, through passage 47, through interior passage 49 of spool valve piston 48, through passage 40, into chamber 45 in cylinder 59 below actuated piston 42. Spool valve piston 48 is shown in this upward position in FIG. 8.

Once spool valve piston 48 is moved upward, the pneumatic pressure exerted on the exterior of fluid piston 44 communicates with the hydraulic fluid in reservoir 46 by means of shaft 55 attached to motive piston 44. Shaft 55 passes through seal wall 65 and is attached to fluid piston 43 in reservoir 46 which forces hydraulic fluid through passages 47, 49 and 40 exerting hydraulic pressure on the bottom of the actuated piston 42. The actuated piston 42 is attached to the stationary electrode. The stationary welding electrode can now be extended using pneumatic pressure rather than a screw and thread type of adjustment. This allows for locating the stationary electrode to a stationary position while the product components are clamped in place.

Once the stationary electrode is positioned correctly, a hydraulic lock mechanism is used. The pneumatic pressure is released, causing the valve biasing means, shown as compression spring 54 located above the spool valve piston 48 to slam the spool valve piston 48 down, causing the flow path of the hydraulic fluid between chamber 45 and reservoir 46 to be interrupted. This interruption occurs because of the misalignment as shown in FIG. 7 of interior passage 49 in the spool valve piston 48 with passages 40 and 47. The hydraulic lock is formed due to the incompressibility of the hydraulic fluid now trapped by the wall of spool valve piston 48 at the entry way of passage 40 to hydraulic chamber 45 under actuated piston 42. This hydraulic lock prevents movement of the stationary electrode while resisting the forces applied by the variable electrode during the welding operation.

Figure 9:
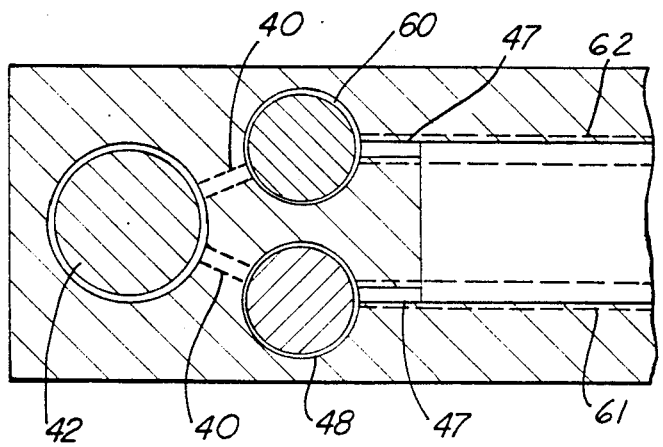
FIG. 9 is a sectional plan view of the actuating piston in communication with both the extending and retracting spool valve pistons.

Refer now to FIG. 9 illustrating a sectional plan view of the preferred embodiment showing the actuated piston 42, an extending spool valve piston 48 (as shown in FIG. 7) and a retracting spool valve piston 60 (not shown in FIG. 7). The retracting device is identical, but separate from the extending device illustrated in FIG. 7. FIG. 7 will be used to illustrate the retraction of the actuated piston 42 via the retracting spool valve piston 60.

Figure 8:
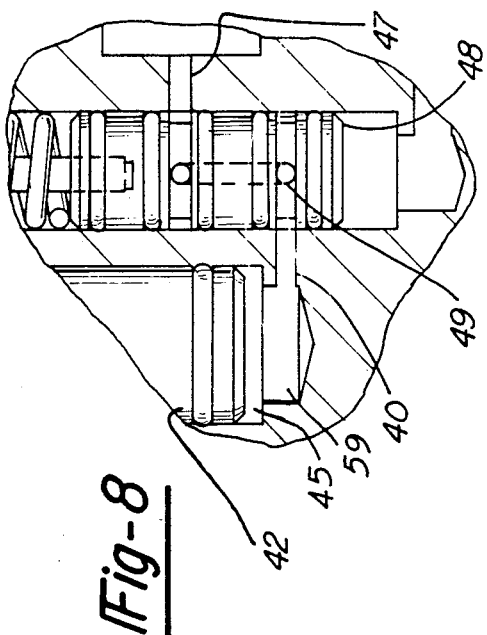
FIG. 8 is a sectional magnified view showing proper alignment of the spool valve piston and the flow passages of the hydraulic system.

Referring back to FIG. 7, upon retraction of the stationary electrode, another spool valve piston —the retracting spool valve piston 60 (FIG. 9) —must align between the hydraulic reservoir 46 and the chamber 45 beneath the actuated piston 42 as shown in FIG. 8 with spool valve piston 60 substituted for spool valve of piston 48.

To align the retracting spool valve piston 60, pneumatic pressure is introduced through retracting air intake 52 from a separate air source than that of the extending air source, intake 51. This pneumatic pressure exerts pressure on the bottom of the retracting spool valve piston 60 and also on the interior side of the motive piston 44, via conduits 62 and 58. This pneumatic pressure on spool valve piston 60 allows alignment of the retracting spool valve piston 60 with flow through passages 40 and 47, which in turn allows hydraulic fluid to flow back into the hydraulic reservoir 46. This pneumatic pressure is also exerted on the interior surface of the motive piston 44 which is attached by shaft 55 to the fluid piston 43 in the hydraulic reservoir 46. A seal wall 65 between the air chamber 63 and the hydraulic reservoir 46 which the shaft 55 passes through separates the chamber 63 and reservoir 46. An pneumatic pressure is exerted on the interior of motive piston 44, forcing it away from the seal wall 65, it pulls the fluid piston 43 and allows hydraulic fluid to be drawn from chamber 45 into hydraulic fluid reservoir 46. As this occurs, the welding electrode retracts from its stationary position.

As the fluid piston 43 is pulled toward the seal wall 65, air must be released from the motive piston chamber 64. This is accomplished through the use of a bleeder valve 53.

Once the actuated piston 42 is completely retracted, the pneumatic pressure is released and the retracting spool valve piston 60 slams down to form a hydraulic lock on the actuated piston chamber 45. This slamming action is accomplished by a retracting valve bias means shown as a compression spring 54 above the spool valve piston.

At this point, both the extending spool valve piston 48 and the retracting spool valve piston 60 are providing a hydraulic lock on the actuating piston chamber 45. The stationary electrode is now ready to be extended to make the next weld.

Figure 10:
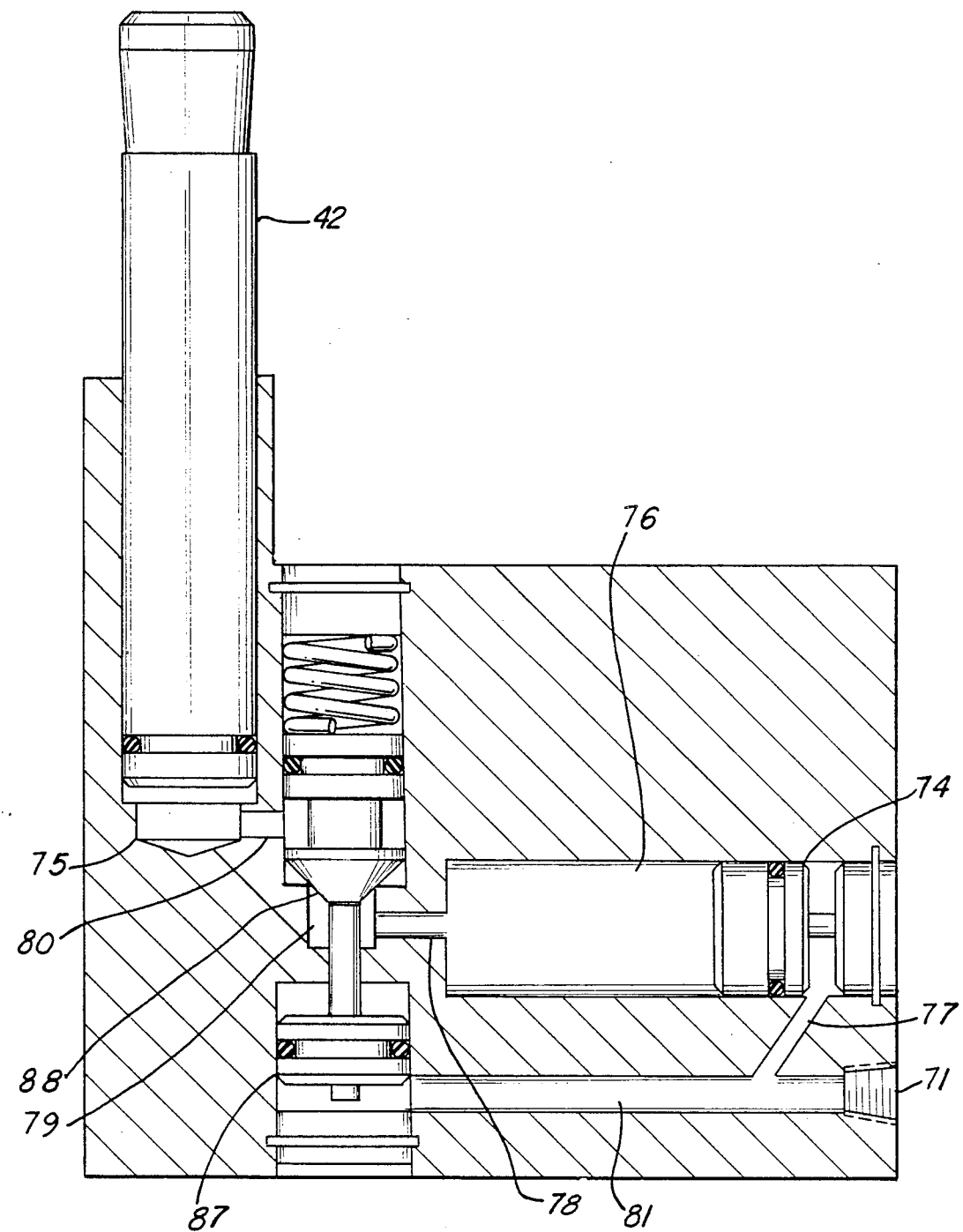
FIG. 10 is a sectional view of a pilot operated poppet valve piston for extending and retracting the actuating piston through the use of pneumatic air pressure.

Referring now to FIG. 10, which illustrates the basic components of the system as in FIG. 7 and FIG. 9, but with a pilot operated poppet valve for extending and retracting the actuated piston 42 through means of pneumatic air pressure. Air is introduced into the system through air intake 71, putting pressure on the bottom of the poppet valve piston 87 and the fluid piston 74, via conduits 81 and 77. This pneumatic pressure forces the piston 88 upward, allowing fluid to flow from the hydraulic fluid reservoir 76, through passage 78, into chamber 79, through passage 80, and into the chamber 75 beneath the actuated piston 42, thereby exerting hydraulic pressure on the actuated piston 42 and extending the electrode into proper position.

Once this is accomplished, a hydraulic lock mechanism may be created through the same mechanism explained in FIG. 7, FIG. 8 and FIG. 9. Similarly, the actuated piston 42 can be retracted using a separate retracting poppet valve piston through the same mechanism as in FIG. 7, FIG. 8 and FIG. 9.

The locating device and hydraulic lock described above can be used in applications other than resistance welding machines. One such application is in a clamp mechanism in which are the fixed jaw of the clamp must be precisely positioned prior to operation of the clamp by actuation of the variable jaw.

It is understood that the invention is not limited to the exact construction illustrated and described above, but that various changes and modifications may be made without departing from the spirit and scope of the invention as defined in the following claims.

What is claimed is:

1. In a resistance welding machine for performing welding operations, with a stationary electrode and a variable electrode, an apparatus for locating the position of the stationary electrode to a stationary position prior to the welding operation, comprising:
   a housing;
   an actuated piston extending from the housing and connected to the stationary electrode for locating the position of the stationary electrode to the stationary position prior to the welding operation;
   a motive piston within the housing;
   means for varying the position of the motive piston attached to the housing;
   a passage between the motive piston and the actuated piston;
   incompressible hydraulic fluid completely filling the passage such that movement of the motive piston will cause displacement of hydraulic fluid which moves the actuated piston thereby locating the stationary electrode to the stationary position prior to the welding operation and also thereby forming a hydraulic lock as a result of the incompressibility of the hydraulic fluid to prevent movement of the stationary electrode while resisting forces applied by the variable electrode during the welding operation.

2. The apparatus of claim 1, further comprising:
   a hydraulic valve in the passage between the motive piston and the actuated piston to control the flow of hydraulic fluid;
   a means for biasing the hydraulic valve to a position which blocks the flow of hydraulic fluid in the passage;
   a pneumatic pressure means for moving the hydraulic valve in opposition to the biasing means to a position which allows the flow of hydraulic fluid in the passage and for moving the motive piston to force the flow of hydraulic fluid in the passage thereby moving the actuated piston to position the stationary electrode to a stationary position prior to the welding operation.

3. In a resistance welding machine for performing welding operations with a stationary electrode and a variable electrode, an apparatus for locating the position of the stationary electrode prior to the welding operation, comprising:
- an actuated piston attached to the stationary electrode;
- a hydraulic system having a hydraulic reservoir, a hydraulic chamber below the actuated piston, a first passage for the flow of hydraulic fluid from the hydraulic reservoir to the hydraulic chamber and a second passage for the flow of hydraulic fluid from the hydraulic chamber to the hydraulic reservoir;
- an air chamber adjacent to the hydraulic reservoir;
- a seal wall separating the hydraulic reservoir from the air chamber;
- a motive piston in the air chamber;
- a fluid piston in the hydraulic reservoir;
- a shaft passing through the seal wall connecting the motive piston to the fluid piston;
- an extending valve in the first passage;
- a first means for biasing the extending valve to a position which interrupts the flow of hydraulic fluid in the first passage, thereby forming a hydraulic lock in the hydraulic chamber and first passage due to the incompressibility of the hydraulic fluid to prevent movement of the stationary electrode while resisting forces applied by the variable electrode during the welding operation;
- an extending pneumatic pressure means for moving the extending valve in opposition to the first biasing means to a position which allows the flow of hydraulic fluid from the hydraulic reservoir to the hydraulic chamber and also for applying pressure to the exterior side of the fluid piston forcing hydraulic fluid flow from the hydraulic reservoir to the hydraulic chamber to extend the stationary electrode to a stationary position prior to the welding operation;
- a retracting valve in the second passage;
- a second means for biasing the retracting valve to a position which interrupts the flow of hydraulic fluid in the second passage, thereby forming a hydraulic lock in the hydraulic chamber and second passage due to the incompressibility of the hydraulic fluid to prevent movement of the stationary electrode while resisting forces applied by the variable electrode during the welding operation;
- a retracting pneumatic pressure means for moving the retracting valve in opposition to the second biasing means to a position which allows the flow of hydraulic fluid from the hydraulic chamber to the hydraulic reservoir and also for applying pressure to the interior side of the fluid piston drawing hydraulic fluid from the hydraulic chamber to the hydraulic reservoir, retracting the electrode from a stationary position.

4. In a clamp for performing clamping operations with a stationary jaw and a variable jaw, an apparatus for locating the position of the stationary jaw to a stationary position prior to the clamping operation comprising:
- a housing;
- an actuated piston extending from the housing and connected to the stationary jaw for locating the position of the stationary jaw to the stationary position prior to the clamping operation;
- a motive piston within the housing;
- means for varying the position of the motive piston attached to the housing;
- a passage between the motive piston and the actuated piston;
- incompressible hydraulic fluid completely filling the passage such that movement of the motive piston will cause displacement of hydraulic fluid which moves the actuated piston thereby locating the stationary jaw to the stationary position prior to the clamping operation and also thereby forming a hydraulic lock as a result of the incompressibility of the hydraulic fluid to prevent movement of the stationary jaw while resisting forces applied by the variable jaw during the clamping operation.

* * * * *